United States Patent
Longtin et al.

(10) Patent No.: US 6,620,361 B1
(45) Date of Patent: Sep. 16, 2003

(54) METHOD OF MANUFACTURING A COMPOSITE SEAL

(75) Inventors: Scott Longtin, Novi, MI (US); Stephen J. Carr, Redford Township, MI (US); Frederick R. Hatch, Ann Arbor, MI (US); Jon A. Chandler, Pawleys Island, SC (US); Gary B. Drake, Convoy, OH (US); Ronald Maurice Noteboom, II, Lenox, MI (US); Michael J. Myers, Van Wert, OH (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/191,945

(22) Filed: Jul. 9, 2002

(51) Int. Cl.[7] ............................................... B29C 45/14
(52) U.S. Cl. ...................... 264/138; 264/161; 264/275; 264/279; 277/569; 277/575; 277/402; 277/924
(58) Field of Search ................................ 264/161, 275, 264/138, 325, 279; 277/569, 575, 560, 402, 407, 924, 946

(56) References Cited

U.S. PATENT DOCUMENTS

| | | |
|---|---|---|
| 3,767,739 A | 10/1973 | Smith |
| 4,119,324 A | 10/1978 | Denton et al. |
| 4,171,561 A | 10/1979 | Bainard et al. |
| 4,239,243 A | 12/1980 | Bainard et al. |
| 4,268,040 A | 5/1981 | Bainard et al. |
| 4,578,856 A | 4/1986 | Butler |
| 4,613,143 A | 9/1986 | Butler |
| 4,738,606 A * | 4/1988 | Christiansen et al. ........ 425/127 |
| 4,822,058 A | 4/1989 | Butler et al. |
| RE33,029 E | 8/1989 | Bainard et al. |
| RE33,192 E | 4/1990 | Bainard et al. |
| 4,969,653 A | 11/1990 | Breen |
| 4,995,621 A * | 2/1991 | Devouassoux et al. ........ 277/37 |
| 5,577,741 A | 11/1996 | Sink |
| 6,050,570 A | 4/2000 | Otto |
| 6,161,838 A | 12/2000 | Balsells |
| 6,213,476 B1 | 4/2001 | Chandler et al. |

* cited by examiner

Primary Examiner—Edmund H. Lee
(74) Attorney, Agent, or Firm—Howard & Howard

(57) ABSTRACT

A method of fabricating a fluid seal for sealing a relatively rotatable member, wherein the fluid seal has an elastomeric sealing member bonded to a PTFE insert. A wafer of PTFE material has a body portion and an end portion of a greater thickness than the body portion. The wafer is placed in a mold cavity with one side of the wafer opposed to a surface portion of the mold cavity. Elastomeric material is forced into the mold cavity to form a molded preform of the elastomeric sealing member and bond the preform to an opposite side of the wafer. The molded preform and bonded wafer are removed from the mold cavity. The end portion of the wafer and an end portion of the preform are trimmed to form the fluid seal.

8 Claims, 1 Drawing Sheet

METHOD OF MANUFACTURING A COMPOSITE SEAL

This invention relates generally to radial lip seals for use with relatively rotatable members, and more particularly to a method of making a composite lip seal formed of two dissimilar materials.

BACKGROUND OF THE INVENTION

Lip-type fluid seals typically employ a flexible sealing member that has one or more sealing lips adapted to engage against a sealing surface of a relatively rotatable member. The purpose of a lip-type fluid seal is to retain application fluids, usually lubricants, and to prevent ingress of environmental contaminants. The selection of the sealing member material is determined by a number of factors, including the environment in which the seal is operating. Elastomerics are often employed as the sealing lip material in applications where the lip seal is exposed to a dirty environment containing such contaminants as water, salt, and abrasives such as dirt, mud, sand, etc. which would be harmful to axle bearings used in certain heavy equipment applications, for example. The lip seal may also be made of other materials, such as polytetrafluoroethylene (PTFE) materials. However, elastomers are far more resistant to wear than PTFE materials under the contaminated conditions referred to above. On the other hand, certain environmental conditions favor PTFE materials over elastomers, such conditions including high and low temperature and/or dry or low lubricant running conditions-.

It is not uncommon for the seal to be subjected not only to a contaminated environment, but also to low or high temperature and/or low lubricity conditions. In the past, a sealing lip with a composite elastomeric/PTFE lip edge has been employed, an example of which is disclosed in U.S. Pat. No. 6,213,476 assigned to the assignee of this invention. However difficulties have sometimes been encountered in the manufacture of such composite elastomeric/PTFE sealing lips.

SUMMARY OF THE INVENTION

It has been found that in molding elastomeric material to an insert of PTFE to form a composite elastomeric/PTFE sealing lip, the elastomeric material, as it flows into the mold, tends to displace or shift the PTFE insert in a condition called "running." The fact that the PTFE insert is typically relatively thin, usually having a thickness of 0.020 inches or less, makes it even more difficult to hold the insert stationary while bonding to the elastomeric material in a compression mold. In accordance with the present invention, it has been discovered that by forming an enlargement on one end of the PTFE insert, the insert is more easily handled when loading it into the mold cavity and will remain in place during the molding process.

Further in accordance with the invention, a wafer of PTFE material having a body portion and an enlarged end portion of greater thickness than the body portion, is supported in the mold cavity. Elastomeric material is forced into the mold cavity to form a molded preform of the elastomeric sealing member and bond it to the wafer. After the preform and bonded wafer are removed from the mold cavity, an end portion of the preform and the enlarged end portion of the wafer are trimmed to form the elastomeric member and the PTFE insert. To further assist in holding the wafer during the molding process, the mold is preferably designed with a built-in lobe engagable with a base end of the wafer.

BRIEF DESCRIPTION OF THE DRAWINGS

These and other advantages and features of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
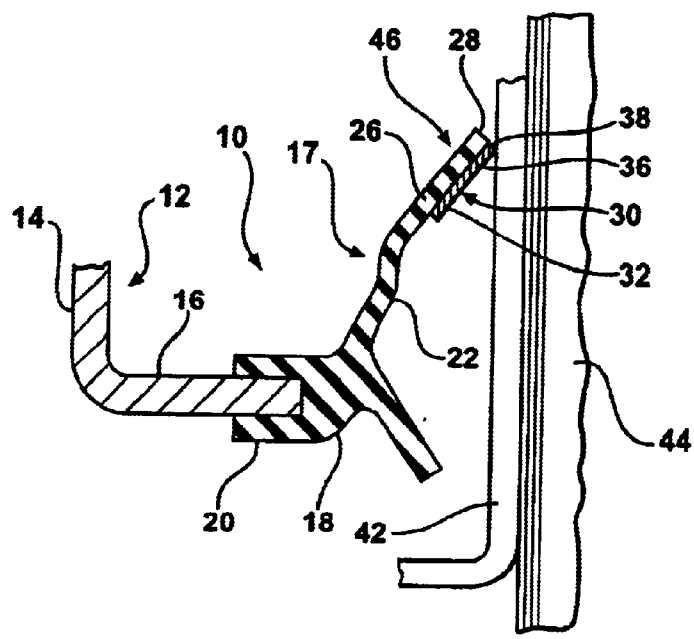
FIG. 1 is a radial sectional view of a portion of a fluid seal assembly having a fluid seal provided with a sealing lip of composite construction, in accordance with the invention.

Referring now more particularly to the drawings, there is shown in FIG. 1 a lip-type fluid seal assembly 10 having a rigid annular case or carrier 12 preferably in the form of a cylindrical, cup-shaped metallic shell having a cylindrical wall 14 and an annular radial flange 16.

The seal assembly 10 also includes a fluid seal 17 having an annular sealing member 18 carried by the case 12. The sealing member 18 is made of any suitable elastomeric material, such as rubber, silicone, polyacrylic, fluoroelastomer, ethylene acrylic, hydrogenated nitrile or nitrile elastomer. The sealing member 18 has an annular body portion 20 fixed to the flange 16 of the case 14, and an annular flex section 22 extending radially outwardly from the body portion 20 at an axially outward inclination, terminating in an annular lip 26 providing a sealing lip edge 28.

An annular non-elastic insert 30 formed of PTFE material which is relatively harder than the material of the sealing member 18 is bonded to the axially inner side of the flex section 22 and the lip 26 of the sealing member 18. The insert 30 has an annular body portion 32 preferably of uniform thickness on the order of about 0.020 inches or less. The insert 30 has an annular lip 36 providing a sealing lip edge 38. The elastomeric and PTFE lip edges 28 and 38 are adapted to sealingly engage a cylindrical sealing surface 42 of a rotatable member 44. Together the lip 26 of the sealing member 18 and the lip 36 of the insert 30 provide an annular sealing lip 46 of composite construction.

The elastomeric lip 26 is disposed on a side of the composite sealing lip 46 which is herein referred to as the contaminated or air side, while the PTFE lip 36 is disposed on an opposite side herein referred to as the protected or fluid side. The composite sealing lip 46 is intended to protect against contaminants such as dust, dirt, sand, road grime, salt, water, etc. from entering the fluid side.

The elastomeric lip edge 28 extends circumferentially continuously so as to shield the PTFE lip 36 from the air side. The PTFE lip edge 38 is likewise preferably circumferentially continuous. As such, the composite sealing lip 46 provides a sealing surface having a continuous band of elastomeric material on the air side and a continuous band of PTFE material on the fluid side.

Figure 2:
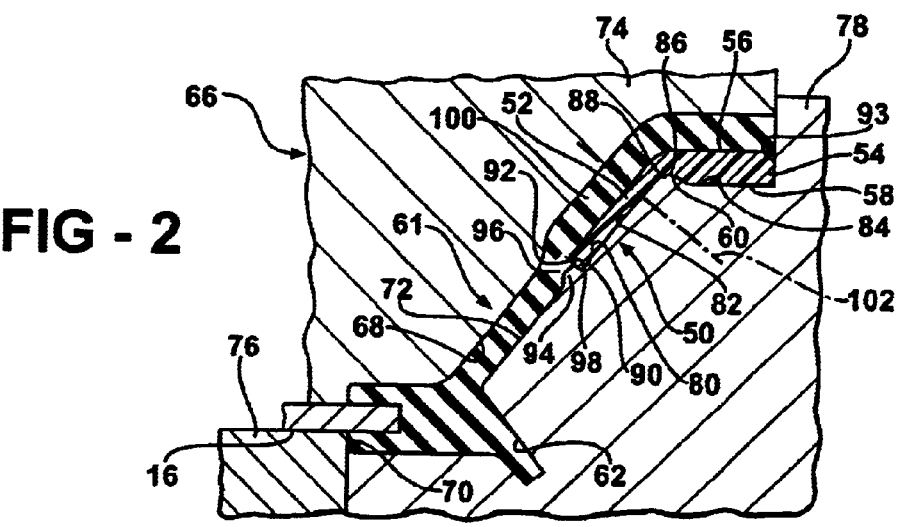
FIG. 2 is a sectional view of a mold used to make the seal assembly of FIG. 1, in accordance with the invention.

The method of making the seal 17 is shown in FIG. 2 and involves the use of an annular wafer 50 of PTFE material. The wafer 50 has an annular body portion 52 at least a portion of which becomes the PTFE insert 30, and also has an annular end portion or head 54 at one end of the body portion. The head 54 of the wafer 50 is enlarged and of increased thickness relative to the body portion 52 as clearly shown in FIG. 2. The surfaces 56 and 58 of the body portion 52 and of the head 54 of the wafer 50 are connected by a curved, preferably arcuate, concave transition surface 60.

Referring further to FIG. 2, the wafer 50 and an elastomeric preform 61 of the sealing member 18, to be more fully described hereinafter, are shown in a mold cavity 62 of a mold tool 66. The mold cavity is formed by opposing, contoured surfaces 68, 70 and 72 of the respective and separate mold parts 74, 76 and 78. The surface 72 of the mold part 78 includes a section 80 having surface segments 82 and 84 which preferably match in configuration and are adapted to support the respective surfaces 56 and 58 of the body portion 52 and head 54 of the wafer 50. Surface segments 82 and 84 are connected by a curved convex surface segment 86 which matches in configuration and is adapted to support the arcuate surface 60 of the wafer 50, the surface segment 86 being formed on a lobe 88 of the mold part 78. In a broader sense, there does not need to be an exact match in configuration of the surface segments 82, 84, 86 of the mold cavity and the surfaces 56, 58, 60 of the wafer because the molding pressure and heat will force the wafer against these mold surfaces. The section 80 terminates in a wall 90 adapted to engage and locate the base end 92 of the wafer 50. The contoured surface 72 of mold part 78 is formed with a second lobe 94 adjacent to the wall 90 to establish a dam 96 which will form an elastomeric abutment 98 as later more fully described.

With the mold tool 66 open, the wafer 50 is laid in the section 80 of the contoured surface 72 of the mold part 78, with the surfaces 56, 58 and 60 respectively fully supported in surface-to-surface relation by the surface segments 82, 84 and 86 of the section 80, and with the base end 92 of the wafer 50 abutting the wall 90. The free end of the head 54 of the wafer 50 abuts a surface 93 of the mold cavity 62.

When the mold parts 74, 76 and 78 are closed, and with the wafer 50 supported in place in the section 80 of the contoured surface 72 of the mold part 78 as described above, elastomeric material is forced into the mold cavity 62 to form the preform 61 of the sealing member 18 and bond it to the wafer insert. The preform 61 includes a lip forming part 100.

The head 54 of the wafer 50, being thicker than the body portion 52, makes the wafer 50 easier to handle when it is loaded into the mold. The head 54, in cooperation with the lobe 88, keeps the wafer 50 from slipping or sliding in the mold before and during the introduction of elastomeric material into the mold cavity 62. The wall 90 of the mold part 78 provides a retainer engageable with the base end 92 of the body portion 54 of the wafer 50 to assist in keeping the wafer from moving while the elastomeric material is flowing into the mold.

After the preform 61 is set and becomes bonded to the wafer 50, the mold is opened and the carrier, preform and bonded wafer are removed, whereupon the lip-forming part 100 of the preform and the wafer are transversely cut or severed along the line 102, leaving the elastomeric lip 26 and the PTFE insert 30 with its lip 36, and discarding the inner portion of the part 100 of the preform and the inner portion of the wafer including the thickened head 54. The fluid seal 17 including the elastomeric sealing member 18 and the PTFE insert 30 is now complete. The dam 96 forms an elastomeric abutment 98 engaging the base end 92 of the insert 30. The elastomeric lip edge 28 and the PTFE lip edge 38 are formed along the line of severance 102.

Figure 3:
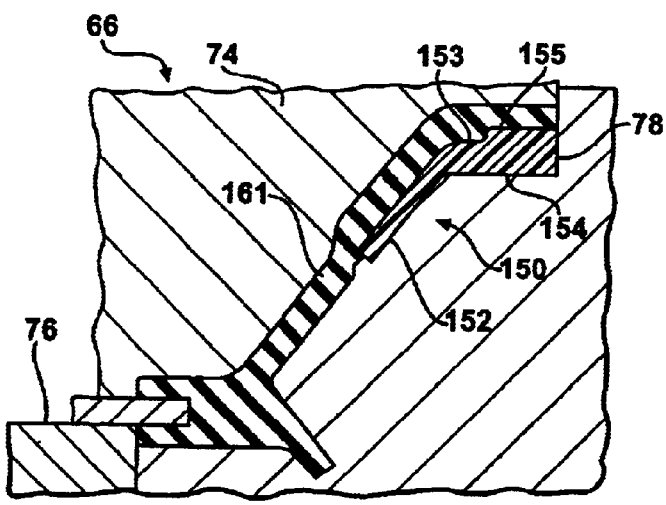
FIG. 3 is a sectional view similar to FIG. 2 in which the PTFE wafer is of a different configuration.

FIG. 3 is similar to FIG. 2 but shows a wafer 150 of a somewhat different construction from the wafer 50. The wafer 150 is like the wafer 50 in that the body portion 152 is the same, but is different in the configuration of the head 154. The head 154 of the wafer 150 is generally like the head 54 of the wafer 50 in that it is thicker than the body portion 152 of the wafer 150. However, the increase thickness is achieved by a displacement of the surface 153 of the head of 154 at the air side, whereas the increased thickness of the head 54 of the wafer 50 is increased in thickness by a displacement of the corresponding surface of the head 54 toward the fluid side. Otherwise, the wafer 150 is like the wafer 50 and the remainder of the mold cavity is the same and the formation of the elastomeric preform 161 is substantially the same except that it appears to be somewhat thinner in the region alongside the head of the wafer 155.

What is claimed is:

1. A method of fabricating a fluid seal for sealing a relatively rotatable member, wherein the fluid seal has an elastomeric sealing member bonded to a PTFE insert, the method comprising:

providing a mold having a mold cavity, providing a wafer of PTFE material having a body portion of a predetermined thickness and an end portion of a thickness greater than the thickness of the body portion, placing said wafer in the mold cavity with one side of the wafer opposed to a surface portion of the mold cavity, forcing elastomeric material into the mold cavity to form a molded preform of said elastomeric sealing member and bonding the molded preform to a side of the wafer opposite said one side thereof, and removing the molded preform and the wafer from the mold cavity and trimming an end portion of said molded preform and the end portion of said wafer to form said fluid seal having the elastomeric sealing member bonded to the PTFE insert.

2. The method of claim 1, wherein the material of the wafer is relatively harder than the elastomeric material.

3. The method of claim 1, wherein the wafer when placed in the mold cavity has said one side thereof fully supported on the surface portion of the mold cavity.

4. The method of claim 1, wherein the mold cavity has a wall providing a retainer engageable with a base end of the wafer when the wafer is placed in the mold.

5. The method of claim 4, wherein the mold cavity has a lobe adjacent said wall adapted to form a dam to establish an abutment portion of the elastomeric material engageable with the base end of the wafer when the wafer is placed in the mold and the elastomeric material is forced into the mold.

6. The method of claim 1, wherein the material of the wafer is relatively harder than the elastomeric material, and wherein the wafer when placed in the mold cavity has said one side thereof fully supported on the surface portion of the mold cavity.

7. The method of claim 6, wherein the mold cavity has a wall providing a retainer engageable with a base end of the wafer when the wafer is placed in the mold.

8. The method of claim 7, wherein the mold cavity has a lobe adjacent to said wall adapted to form a dam to establish an abutment portion of the elastomeric material engageable with the base end of the wafer when the wafer is placed in the mold and the elastomeric material is forced into the mold.

* * * * *